INVENTORS
HOWARD J. WILLIAMS
JAMES E. HURTLE
BY
R. Y. Brodahl
ATTORNEY

June 13, 1961 H. J. WILLIAMS ET AL 2,987,876
EXHAUST NOZZLE CONTROL FOR GAS TURBINE ENGINES
Filed Feb. 29, 1956 2 Sheets-Sheet 2

THROTTLE POSITION

INVENTORS
HOWARD J. WILLIAMS
JAMES E. HURTLE
BY
R. J. Brodahl
ATTORNEY

United States Patent Office 2,987,876
Patented June 13, 1961

2,987,876
EXHAUST NOZZLE CONTROL FOR GAS TURBINE ENGINES
Howard J. Williams and James E. Hurtle, South Bend, Ind., assignors to The Bendix Corporation, a corporation of Delaware
Filed Feb. 29, 1956, Ser. No. 568,630
5 Claims. (Cl. 60—35.6)

The present invention relates to a control system for a gas turbine engine, and more particularly relates to a control system for a gas turbine engine having a variable area exhaust nozzle.

In general a control system for an internal combustion engine and particularly a gas turbine engine includes a main fuel system which controls the engine speed, an afterburner fuel system which controls the engine thrust augmentation, a nozzle area system which controls the engine thrust, as well as the fuel consumption and the turbine exhaust gas temperature, and finally an airflow guide vane position system which controls the engine inlet airflow angle affecting the thrust of the engine, as well as the fuel consumption and the compressor stall characteristic of the engine.

The particular gas turbine engine under consideration shall be controlled by the manipulation of five independent variables namely: the main engine fuel flow, the exhaust nozzle area, the temperature trim control, the guide vane position, and the afterburner fuel control. The engine is controlled according to predetermined schedules with limits being placed on the dependent variables namely: engine speed, the turbine exhaust gas temperature and the compressor unit discharge pressure; and the independent variables, namely: afterburner fuel flow and main engine fuel flow.

A single control member may be used to control the above variables to set a desired engine operating condition under all service conditions. This control member may be in the form of a manual control throttle member which may control the engine within 110 degrees of position rotation of the control throttle member as follows:

From 0 to 3° position setting of the control throttle member, the engine is in the non-operative condition;
From 10° to 13° position setting of the throttle member, the engine will operate in a starting and idle condition;
From 13° to 75° position setting, the engine shall operate from the idle through the cruise and to military conditions;
From 75° to 78° position setting, the engine operates in the military condition; and
From 78° to 110° position setting, the engine operates in the afterburning to the maximum power conditions.

It is an object of the present invention to provide an improved control system for an internal combustion engine.

It is another object of the present invention to provide an improved control system for a jet engine having a variable area exhaust nozzle.

It is a different object of the present invention to provide an improved nozzle area control which operates as a function of the position of the engine control throttle member.

It is a further object to provide an improved nozzle area control system which controls the nozzle area as a function of the outlet temperature of the gas turbine unit.

It is an additional object of the present invention to provide an improved control system for a jet engine which schedules the exhaust nozzle area as a function of the control throttle setting up to a predetermined operating condition of the engine and as a function of some predetermined temperature beyond that operating condition.

It is still another object of the present invention to provide a nozzle area control which can control the area of the exhaust nozzle from a maximum to a minimum in a time period of the order of one second.

It is a still different object of the present invention to provide an improved exhaust nozzle control system for an internal combustion engine which is operative to control the thrust of the engine, to control the fuel consumption of the engine and in addition to control the exhaust or outlet temperature of the engine as functions of the area of the exhaust nozzle.

The above and additional objects and advantages of the present invention will become apparent when considered in view of the following description taken in conjunction with the drawings wherein.

Figure 1:
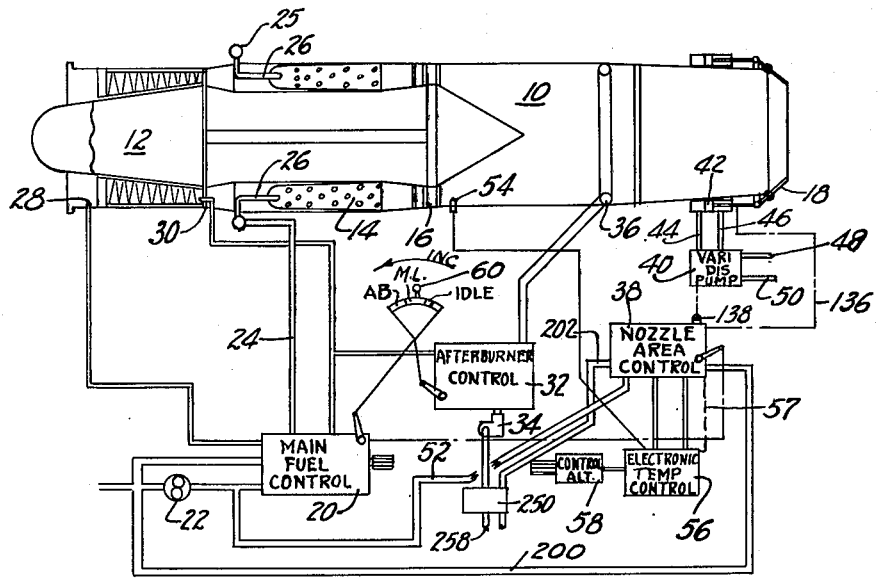
FIGURE 1 is a schematic diagram of a control system for a gas turbine engine in accordance with the present invention.

Referring now to FIGURE 1, there is shown a gas turbine engine 10 including a compressor unit 12, a combustion chamber 14, the turbine unit 16, and the exhaust nozzle gates 18 which control the area of the exhaust nozzle. A main fuel control 20 is provided, which main fuel control receives fuel through a main fuel pump 22 and supplies it along a fuel conduit 24 to the main fuel manifold 25 which supplies fuel to the main fuel nozzles 26. The main fuel nozzles 26 supply the fuel in suitable form to the combustion chambers 14. A compressor inlet temperature responsive element 28 is provided to supply information to the main fuel control 20 regarding the temperature of the inlet gases to the compressor unit 12. A pressure sensing device in a form of a probe or like member 30 is provided at the outlet of the compressor 12 to supply information to the main fuel control 20 regarding the discharge pressure of the gases at the outlet of the compressor unit 12.

An afterburner control 32 is provided and is supplied fuel from the afterburner fuel pump 34 and feeds this fuel to the afterburner fuel manifold 36 and the afterburner nozzles. The compressor discharge pressure responsive device 30 is also connected to the afterburner control 32. A nozzle area control 38 is provided for controlling the position of the exhaust gates 18 by means of a fluid pump 40 which may be a variable discharge pump and which controls the position of one or more gate control pistons 42. The discharge pump 40 has a pair of output conduits 44 and 46 which position the piston 42 to the left, as shown in FIGURE 1, if the exhaust nozzle gates 18 are to be opened to increase the exhaust nozzle area or to move the piston 42 to the right if the exhaust nozzle gates are to be closed to reduce the area of the exhaust nozzle. The discharge pump 40 is supplied fluid from any suitable source (such as the outlet of the fuel pump 22 or some other fluid supply) through a pair of fluid conduits 48 and 50. The nozzle area control 38 is supplied fuel or some other fluid at a reference pressure such as pump outlet fuel pressure $P_1$ through the fuel conduit 52 from the outlet of the main fuel pump 22. The exhaust gas or outlet temperature of the turbine unit 16 is measured by a temperature responsive device 54 which supplies this temperature information to an electronic control unit 56 through a suitable information connection, as shown. The electronic control unit 56 comprises an electronic amplifier unit, and is supplied power from an engine driven control alternator 58 which is provided as an auxiliary source of power. The output of the electronic temperature control unit 56 is fed to the nozzle are control 38 such that for certain operating conditions of the gas turbine engine 10 the outlet temperature of the turbine 16 can be used as an override or dominating control for the exhaust nozzle gates 18. A manual control throttle member 60 is provided, with the position or setting of the manual control throttle 60 being supplied as a control parameter to the main fuel control unit 20, to the afterburner control unit 32 and to the nozzle area control 38.

The electronic amplifier unit 56 may be similar to that covered in copending patent application Serial No. 560,670, filed January 23, 1956 by N. K. Peters and D. A. Reynick and assigned to the same assignee as the present application.

Figure 2:
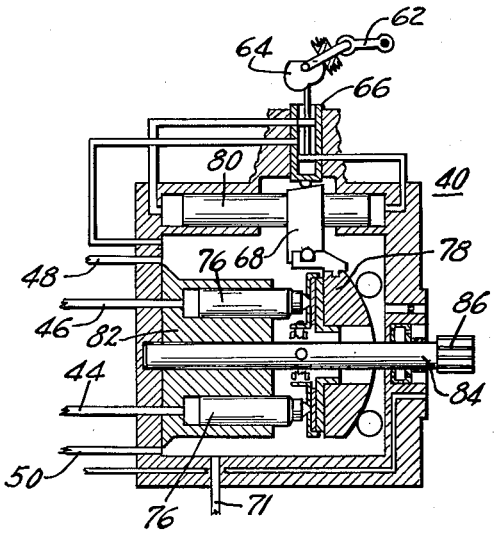
FIGURE 2 is a side sectional view of a variable discharge pump suitable for use in controlling the position of the exhaust nozzle gates.

In FIGURE 2 there is shown a variable discharge pump, which is suitable for use as the discharge pump 40 shown in FIGURE 1 for controlling the position of the exhaust nozzle gates 18. The output of the nozzle area control unit 38 is fed to the control arm 62 which in turn adjusts the position of a control cam 64. A control valve 66 is operated by the control cam 64 to move or position a follow-up cam 68. The fluid input to the pump 40 may be supplied through fuel conduits 48 and 50 or a fluid conduit 71 may be connected to the output of the main fuel pump 22. The output from the discharge pump 40 is supplied through fuel conduits 44 and 46. The actual pumping is done by pumping pistons 76 which are controlled in stroke length by a variable position wobble member 78. The position of the wobble member 78 is controlled by a stroke control piston 80. The pumping pistons 76 are positioned within pumping cylinders which are part of a rotating pump assembly 82, which rotating pump assembly is rotated by a drive shaft 84 having a drive spline 86 driven by the drive shaft 11 of the gas turbine engine 10.

Figure 3:
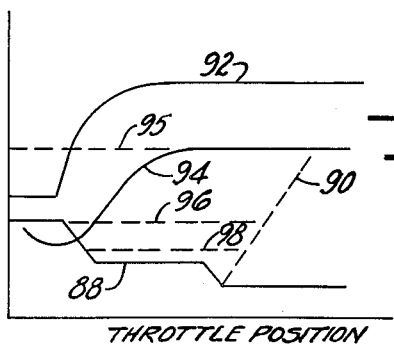
FIGURE 3 is a graph illustrating the nozzle area as a function of the control throttle position or setting.

In FIGURE 3 there is shown a graph or curve 88 illustrating the area of the exhaust nozzle as determined by the gates 18 as a function of the position or setting of the control throttle 60 shown in FIGURE 1. The curve 88 extends from the military position to the right of FIGURE 3 as a horizontal line to indicate the theoretical nozzle area as determined by the nozzle area control 38; however, in practice, the actual nozzle area follows the dotted curve portion 90 which represents the temperature override as provided by the turbine discharge temperature responsive device 54 shown in FIGURE 1. The speed of the gas turbine engine in revolutions per minute is illustrated by the curve 92 as a function of throttle position. Curve 94 illustrates the operational temperature of the turbine as a function of throttle position, with the line 95 representing substantially constant maximum allowable turbine outlet temperature. The lines 96 and 98 define the speed lock range of operation provided to compensate for the required amount of time for actual engine acceleration in excess of the time required for physical movement of the throttle member 60 shown in FIGURE 1. Therefore, when the throttle member 60 is moved to increase engine speed, the nozzle area control 38 responds faster than the actual change in engine speed such that the nozzle area tends to close faster than is desired and thereby tends to hinder rapid acceleration of the engine; to avoid this happening, the nozzle gates 18 are locked or fixed in a predetermined position whenever the actual engine speed is below a prescheduled percentage of requested engine speed as requested by the throttle member 60. The latter locking operation only prevents a closing action of the nozzle beyond the predetermined position. If the nozzle area is larger than this position, closing to this position can still occur. Also, movement in an opening direction is not affected by the lock operation.

Figure 4:
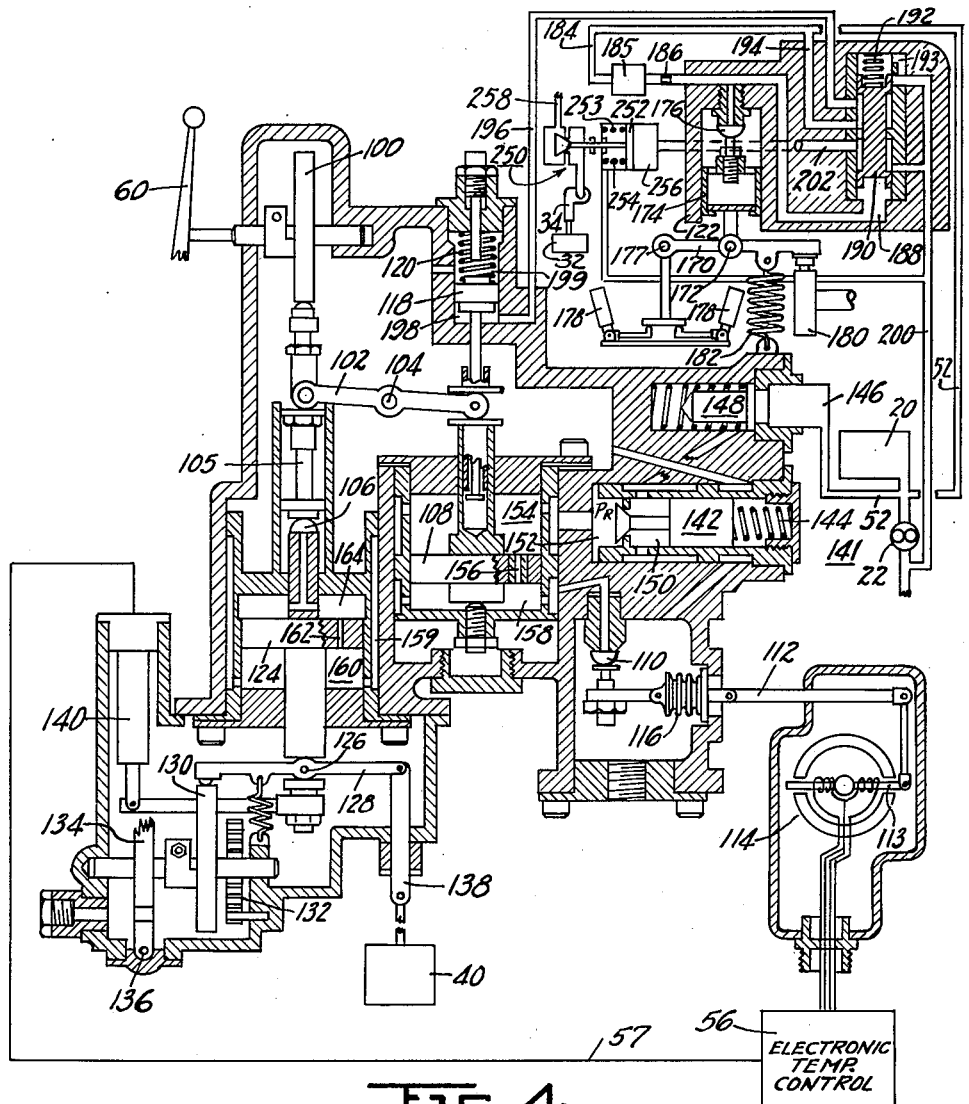
FIGURE 4 is a sectional view of an exhaust nozzle area control in accordance with the present invention.

Referring to FIGURE 4 there is shown the schematic illustration of the nozzle area control 38 shown in FIGURE 1. The setting or position of the control throttle 60 is fed to a two dimensional nozzle area scheduling cam 100. The output of the latter cam 100 is fed to a first end of a pivoted control lever 102 which lever is pivoted at fixed pivot point 104. This same first end of the control lever 102 controls the position setting of a servo pilot valve or half ball control valve 106. The second end of the control lever 102 is controlled by a temperature responsive power piston 108, the position of which is controlled by a servo control valve 110. The latter servo control valve 110 is controlled in position by a control lever 112 which is connected to the output of a torque motor 114. The torque motor 114 is connected to the output of the electronic temperature control unit 56 shown in FIGURE 1. The control lever 112 acts through a bellows fluid seal 116. The second end of the control lever 102 is also controlled by a speed lock-out piston 118 which operates against the force of a predetermined compression spring member 120 and control fuel at pump inlet pressure $P_0$ and is operated by control fuel at reference pressure $P_1$ from a speed lock-out control unit 122 to be described more fully hereafter. The servo pilot or control valve 106 controls the position of an output power piston 124. The output power piston 124 is connected to determine the position of a variable fulcrum 126 for an output control lever 128. A first end of the output control lever 128 rides on an exhaust nozzle position feedback cam 130. This cam is positioned against the action of a torsion load spring 132 to take the backlash out of the positioning of the nozzle feedback cam 130 by a driven pulley or sheave member 134 which is operated by the positive drive flexible connecting member 136 shown in FIGURE 1 and controlled to follow the actual exhaust nozzle position by a suitable driver member such as a driver, pulley or sheave connected to rotate in conformance with the movement of the gate control pistons 42 and the nozzle gates 18. The other end of the output control lever 128 operates through a control arm 138 to adjust the position of the control cam 64 of the variable discharge pump 40 shown in FIGURE 2. A potentiometer or like member 140 is connected to be responsive to the position of the output power piston 124. The potentiometer 140 may be of a linear type of potentiometer and is operative to send a signal to the electronic temperature control unit 56 that is proportional to the rate of piston travel. This signal may be employed as a damping voltage to minimize overshooting or hunting during area control by the electronic temperature control 56.

The servo valve system shown in FIGURE 4 is supplied with servo control fuel at the desired substantially constant servo pressure $P_R$ as is well known in this art. The servo pressure regulator 141 used for this purpose includes a spring loaded valve 142 with the spring load provided by the compression spring 144 and controlling the $P_R$ pressure used for the servo valve system. Control fuel is supplied by means of conduit 146 connected to conduit 52 shown in FIGURE 1 through a filtering screen 148 into the chamber 150 at the inlet side of the spring loaded valve 142. The operation of the servo pressure regulating valve 142 results in control fuel at the desired servo pressure in the outlet chamber 152. The servo control fuel at servo pressure $P_R$ passes into the chamber 154 at a first side of the temperature power piston 108. This servo control fuel then passes through a servo orifice 156 at pressure $P_X$, into fluid chamber 158, and is there controlled by the servo pilot valve 110 in response to the turbine outlet temperature by means of the electronic temperature control unit 56 operating through the torque motor 114 and the control lever 112 to thereby adjust the position of the control power piston 108 in accordance with the outlet temperature of the turbine unit 16. The servo control fuel at servo pressure $P_R$ also passes through the annulus 159 into the chamber 160 at a first side of the output power piston 124. This servo control fuel then passes through a bleed orifice 162 at pressure $P_X$ into a chamber 164 at the second side of the output power piston 124. The control fuel at pressure $P_X$ in the chamber 164 is controlled by the servo control valve 106 to thereby control the position of the output power piston 124.

The off-speed control unit 122 includes a control lever 170 which is connected at pivot connection 172 to a control piston member 174 for the servo pilot valve 176. This control lever 170 is connected at a first end 177 to the output of the speed responsive centrifugal weights 178. The opposite end of the control lever 170 rides on a desired speed setting or scheduling cam 180 which is mechanically connected to the throttle member 60 such that the position of the cam 180 is determined by the manual control throttle 60. A tension spring 182 is connected to the control lever 170 between the end which rides on the speed setting cam 180 and the pivot connection 172 to keep or load the end of the control lever 170 which rides on the speed setting cam 180 in contact with that cam. Control fuel at pressure $P_1$ is supplied to the off-speed control unit 122 through the fuel conduit 184. A servo pressure regulator 185 is provided to supply servo control fluid at servo pressure $P_R$. The servo pressure regulator 185 may be similar to the servo pressure regulator 141, previously described. The servo control fluid at pressure $P_R$ passes through a fixed servo orifice 186 and into a control fluid chamber 188 at pressure $P_X$ to control a movable shuttle valve member 190. The shuttle valve member 190 is spring loaded by compression spring member 192 and is further loaded by control fuel at pump inlet pressure $P_0$ within the fluid chamber 193 to control the movement of the shuttle valve 190 against the fluid pressure $P_X$ in the chamber 188 as controlled by the position of the servo control valve or half-ball 176. Control fuel from the main fuel pump 22 is supplied to the off-speed control unit 122 through fuel conduit 194 which may be connected to fluid conduit 52. With the position of the shuttle valve 190 as shown in FIGURE 4, the control fuel at pressure $P_1$ is allowed to pass from the fuel conduit 194 to an outlet fuel conduit 196 which is connected to the fluid chamber 198 at one side of the off-speed control piston 118. Similarly control fuel at pump inlet pressure $P_0$ is supplied through fluid conduit 200 shown in FIGURES 1 and 4 to the off-speed control unit 122. In the position of the shuttle valve 190 as shown in FIGURE 4 this control fuel at pressure $P_0$ supplied through the fluid conduit 200 passes through the outlet fluid conduit 202 to the afterburner control unit 32 as shown in FIGURE 1.

The afterburner control 32 may be in accordance with the teachings of a copending patent application filed December 28, 1955, Serial No. 555,882, by T. B. Card, F. R. Rogers and R. R. Riggs and a copending patent application filed December 28, 1955, Serial No. 555,851 by T. B. Card, with both of these copending patent applications being assigned to the same assignee as the present invention. The position of the shuttle valve 190 as shown in FIGURE 4 represents the off-speed operative condition of the gas turbine engine. In other words, the desired speed setting as supplied by the speed cam 180 is different from the actual speed determined by the speed responsive fly-ball weights 178. When an off-speed condition of the gas turbine engine is present the control fuel at pressure $P_1$ is introduced into the chamber 198 to move the control piston 118 such that through the control lever 102 the travel of the off-speed control piston 118 prevents any operation of the servo system that would close or decrease the exhaust nozzle area. On the other hand, the flow of control fuel at pressure $P_0$ to the afterburner is operative to prevent the flow of afterburner fuel to augment the thrust of the gas turbine engine. When an on-speed condition of the engine prevails the control fuel at pressure $P_0$ passes to the chamber 198 adjacent the off-speed control piston 118 to balance that piston against the control fuel at pressure $P_0$ within the opposite chamber 199, and the force of the compression spring bias member 120, and thereby prevents the travel movement of the off-speed control piston 118 that would prevent the operation of the servo system to close the nozzle area. Further, for the on-speed condition, the control fuel at pressure $P_1$ is supplied to the afterburner control unit 32 for control purposes through the outlet fuel conduit 202 to enable an increase in the thrust augmentation by the afterburner control unit 32, if necessary, since the gas turbine engine is already operating on the desired speed as scheduled by the speed cam 180 and as measured by the speed responsive fly-ball weights 178. The operation of the afterburner unit in this respect is such that a control valve 250 is provided for controlling the supply of fuel to the afterburner fuel pump 34 in a manner similar to the teachings of a copending patent application filed December 15, 1955, Serial No. 553,316 by F. R. Rogers and assigned to the same assignee as the present invention. The latter control valve 250 is positioned in the fuel supply conduit connected to the afterburner fuel pump 34 as shown in FIGURE 1, and is controlled by a control piston 252. A first side of this piston 252 is exposed to a first fluid chamber 254 containing fluid at pressure $P_0$. Also a compression spring 253 is positioned within said first fluid chamber 254 and acts against the first side of the control piston 252. The second and opposite side of the control piston is exposed to a second fluid chamber 256 connected to the outlet fluid conduit 202 shown in FIGURE 4 and in FIGURE 1. Hence, when control fluid at pressure $P_1$ is supplied to the second fluid chamber 256 the control piston 252 is moved in a first direction to open the control valve 250 and to allow the supply of fuel to the afterburner pump 34 from the fuel supply conduit 258. However, when control fluid at pressure $P_0$ is supplied through outlet conduit 202 to the second fluid chamber 256 the resultant force of this control fluid is balanced by the force of the control fluid at pressure $P_0$ already within the first fluid chamber 254, such that the compression spring 253 is able to move the control piston 252 in a second direction, opposite to said first direction, to close the control valve 250 and to thereby prevent the supply of fuel to the afterburner pump 34 and hence to prevent the supply of afterburner fuel to the afterburner control 32.

In the operation of the apparatus shown in FIGURE 1 the nozzle area control unit 38 operates to schedule or determine the exhaust nozzle area as a function of the position or setting of the control throttle 60, when the engine is operating between idle and military throttle settings or speed conditions. In addition, the nozzle area control unit 38 controls or schedules the nozzle area as a function of a predetermined limiting turbine unit outlet or discharge temperature during the military and afterburning operation of the engine, which operation is determined by the setting or position of the throttle member 60. In this respect the nozzle area control unit 38 varies the jet nozzle area such that optimum or desired thrust and specific fuel consumption are obtained for all engine operating and flight conditions. The nozzle area control unit 38 receives a signal from the main fuel control throttle 60 which signal is then used to schedule an output signal in the form of a movement of shaft 138 shown in FIGURE 4 to control the output of the variable discharge pump 40. This shaft movement represents the error between the desired and the actual nozzle positions. The actual nozzle position is supplied to nozzle area control 38 by a mechanical feedback as illustrated by the positive drive flexible control member 136, and which connects to the cooperative sheave or pulley 134 shown in FIGURE 4.

The output shaft movement of output shaft 138 controls the stroke of a variable displacement oil pump 40 which supplies oil pressure to the nozzle actuator pistons 42. The output shaft or control arm 138 controls the stroke of the variable discharge oil pump 40.

The movement of output shaft 138 as scheduled by the control throttle 60 controls the nozzle area during sub-military operations, in other words, when the speed of the engine is below military speed. During the transition from the sub-military to the military operation, which occurs at a position of control throttle 60 of approximately 75° to 78°, the throttle schedule is such that the nozzle area position demanded will cause an excessive turbine unit outlet or discharge temperature which will be detected by the temperature responsive device 54. When a predetermined maximum temperature limit is reached the electronic temperature control unit 56 takes control of the nozzle area by causing the throttle schedule as determined by cam 100 to be overriden by movement of the temperature responsive piston 108. During military and afterburning operation of the engine, the nozzle area is completely controlled by the electronic temperature control unit 56 and the predetermined turbine unit outlet or discharge temperature is maintained by the temperature responsive device 54. This operation is illustrated by the curve 88 shown in FIGURE 3.

From zero engine speed until the engine reaches the military operating speed the nozzle area is controlled by the control throttle 60. For engine speeds above the military speeds and within the afterburning zone up to maximum engine speed the nozzle area control unit 38 theoretically maintains the nozzle area constant as shown by the horizontal portion of the curve 88 to the right of the military speed position. However the nozzle area is actually controlled by the temperature responsive device 54 and the electronic temperature control unit 56 such that the actual nozzle area follows the rising curve 90 to indicate that the nozzle area opens.

The engine actually requires an amount of time to accelerate in excess of that required for physical movement of the control throttle 60. Therefore, during a throttle burst or sudden movement the response of the nozzle area control unit 38 to the movement of the control throttle 60 is faster than the actual engine acceleration and the nozzle area tends to close faster than desired and therefore tends to hinder rapid acceleration of the engine. To avoid this undesired situation the exhaust nozzle is locked in a predetermined position whenever the engine speed is below a prescheduled percentage of the speed demanded by the engine speed cam 180. The off-speed control unit 122 accomplishes this function. The engine lock prevents only closing of the exhaust nozzle beyond the predetermined position. If in fact the area of the exhaust nozzle is larger than this predetermined position, the exhaust nozzle can still close until the above mentioned predetermined position is reached. Movement of the exhaust nozzle in the opening direction is not affected by the off-speed lock-out control device 122.

With reference to FIGURE 4, the physical movement of the control throttle 60 is transmitted to the nozzle area control unit where it is resolved in a rotation of a two dimensional scheduling cam 100. This cam movement through a connecting arm 105 positions a servo pilot valve 106 which causes an output power piston 124 to move. It should be noted that the output power piston 124 provides differential areas exposed to the control fluid within respective fluid chambers 160 and 164. The area of piston 124 exposed to the fluid at pressure $P_R$ within the fluid chamber 160 is less than the area of piston 124 exposed to the fluid at pressure $P_X$ within the fluid chamber 164. The actual nozzle position is fed back to the control unit by a suitable mechanical linkage or coupling cable 136 where it is resolved into rotation of a two dimensional feedback cam 130. The movement of the output power piston 124 resulting from rotation of the scheduling cam 100 is mixed by the control lever 128 with the output of the feedback cam 130 and the resultant movement or error signal is transmitted to the control output shaft 138 to control the position of the exhaust nozzle gates 18 through the power pistons 42 by means of the variable discharge pump 40.

During military and afterburning operation of the engine as scheduled by the control throttle 60 of the pilot or engine operator, the area of the exhaust nozzle is controlled by the electronic temperature control unit 56. The nozzle area scheduling cam 100 signals for closing the nozzle area such that maximum temperature conditions are encountered. However, at this point the signal from the electronic temperature control unit 56 is sent to the torque motor 114. The output of the torque motor 114 consists of a small deflection of the armature shaft 113 which movement is sent through the control lever 112 to the servo pilot valve 110. Movement of the pilot valve 110 causes the temperature power piston 108 to move the control lever 102. This control lever 102 contacts the servo pilot valve 106 through the connecting member 105 and it effectively overrides the output signal from the throttle scheduling cam 100, resulting in a movement of the output shaft or arm 138 that signals for opening of the exhaust nozzle area until the predetermined limit temperature is maintained at the output of the turbine unit 16 as indicated by the temperature responsive device 54. Since the temperature responsive device 54 constantly sends a temperature signal to the electronic temperature control unit 56, the operation of the entire control unit is a closed loop system that constantly regulates the area of the exhaust nozzle to maintain the desired temperature at the output of the turbine unit 16.

In this respect the nozzle area scheduling by the throttle scheduling cam 100 is proportional in operation, such that the amount correcting or control action is proportional to the actuating error. On the other hand, the nozzle area scheduling by the temperature power piston 108 is integrating in operation, such that the rate of correction is proportional to the actuating error. Hence, the latter operation is such that the amount of correction is in effect independent of the amount of error, and the amount of error determines the rate of correction.

The potentiometer 140 which is connected to move with the output power piston 124 sends a signal through the connection 57 shown in FIGURE 1 to the electronic temperature control unit 56 which signal is proportional to the rate of travel of the output power piston 124. This signal provides a damping voltage which minimizes overshooting or hunting during the area control by the electronic temperature control unit 56.

The off-speed control unit 122 consists of a piston or shuttle valve 190 that is controlled by servo control fuel at pressure $P_X$ within fuel chamber 188 from the servo pressure regulating control valve 185 and fixed orifice member 186 on one side and is vented to control fuel at pressure $P_0$ on the other side and within fuel chamber 193. The piston 190 is also spring loaded by the compression spring member 192. When the engine is operating on the desired speed as scheduled by the speed cam 180 the piston 190 is balanced between the forces of the fluid pressure $P_0$ within fluid chamber 193 and compression spring 192 on one side and the force of fluid pressure $P_X$ within the fluid chamber 188 on the other side. When the servo pilot valve 176 receives an off-speed signal from the control member 174 the load of the compression spring bias member 192 is overcome and the piston 190 will travel to the position shown in FIGURE 4 such that control fuel at pressure $P_1$ passes through the fuel conduit 196 to the piston chamber 198 to move the control piston 118 such that through the connecting linkage including the control lever 102 the servo system including the servo pilot valve 106 is prevented from closing or decreasing the exhaust nozzle area. The amount of the travel of the control piston 118 is so predetermined as to achieve the desired point at which the off-speed block control unit 122 is operatively effective.

In the operation of the variable discharge pump 40 which is schematically illustrated in FIGURE 2 the control cam 64 receives a signal from the output control shaft 138 shown in FIGURE 4, to vary the position of the follow-up cam member 68 and thereby determine the angular position of the wobble plate member 78 to determine the stroke and therefore the discharge amount of the respective pistons 76 moved by the wobble pump member 78. Therefore as the pump rotating assembly 82 is rotated by the shaft 84 and its drive spline 86 which is actuated by the gas turbine engine, control fuel is received from the inlet fuel conduit 48 and 50 and pumped out of either one of the output fuel conduits 44 or 46 depending upon the desired movement direction of the exhaust nozzle gates 18.

It should be here noted that the temperature responsive power piston 108 is of the differential area type, similar to the output power piston 124. Also, the main fuel control may be similar to that shown and described in a copending patent application filed April 5, 1955, Serial No. 499,432 by H. J. Williams, F. R. Rogers and B. J. Ryder and assigned to the same assignee as the present application. Further, it is within the teachings of the present invention to use some control fluid other than engine fuel to actuate the nozzle area control 38 and other components of the system, such as the variable discharge pump 40. It is further within the teachings of the present invention to vary the contour surfaces of the throttle scheduling cam 100 and the feedback cam 130 to change the nozzle area scheduling as may be desired, and other than the specific schedules shown in FIGURE 3, as determined by practical operating requirements.

The present invention contemplates the use of any known types of servo mechanisms wherever needed to provide power operation.

Although only a preferred embodiment of the present invention has been schematically illustrated and described, it will be apparent to those skilled in the art that various changes in the structure and relative arrangement of parts may be made to suit individual requirements without departing from the scope and spirit of the present invention.

We claim:

1. In a control system for an engine having an exhaust nozzle and an engine control throttle member, a fluid pressure responsive control piston connected to said exhaust nozzle and movable in position for varying the area of said exhaust nozzle, a variable discharge pump having a variable position wobble member for controlling the fluid pressure output thereof fluidly connected to said control piston for controlling the direction and rate of movement thereof in response to the direction and degree of tilt of said wobble member, a movable control lever connected on one end to said wobble member to control the direction and degree of tilt thereof in response to position of said one end of said control lever, cam means including a contoured cam surface connected to said control lever for positioning said control lever in response to variations in said cam surface, said cam means being progressively positioned by said throttle member such that changes in the position of said throttle member induces progressive changes in the position of said control lever, and means for providing an error signal representative of the departure between actual engine speed and desired engine speed as indicated by the position of said throttle and operatively connected to said control lever for preventing movement thereof when said error signal exceeds a predetermined quantity.

2. In a system for controlling the area of the exhaust nozzle of an engine, said engine including a control throttle member, the combination of a fluid pressure responsive control piston movable in position for varying said nozzle area, a variable stroke pump having a wobble plate member movable in position to control the stroke thereof fluidly connected to said control piston to control the rate of movement thereof in response to the position of said wobble plate member, a control lever having a variable fulcrum connected on one end to said wobble plate to control the position of said wobble plate and the rate of movement of said control piston in proportion to the position of said one end of said control lever, cam means responsive to the position of said control throttle member and operatively connected to said variable fulcrum for progressively moving said fulcrum in response to progressive changes in the position of said control throttle member, feedback means responsive to the area of said exhaust nozzle and operative in cooperation with said throttle member to control the position of said control lever, and third control means responsive to the position of said control throttle for providing a desired engine speed schedule and operatively connected to said control lever for preventing the movement thereof during an engine accelerating range of operation.

3. In a control system for the variable area of an engine exhaust nozzle, the combination of a fluid pressure responsive control piston movable in position for varying said area, a pump having a movable wobble plate for varying the discharge thereof fluidly connected to said control piston to control the rate of movement of said control piston in response to the position of said wobble plate, a movable control lever connected to said wobble plate for controlling the position thereof, first means responsive to the area of said exhaust nozzle operatively connected to said control lever, a throttle member operative to provide an exhaust area schedule and an engine speed schedule operatively connected to said control lever so that said control lever is moved in proportion to the error between the exhaust area and the exhaust area schedule, second means responsive to the rotational speed of said engine, with the output of said second means and said throttle member being differentially combined and operatively connected to said control lever to prevent movement of said control lever in response to the error between engine speed and scheduled speed.

4. In a gas turbine engine control system, said engine including a variable area exhaust nozzle, the combination of a control device including a control member movable in position for varying said area, a throttle connected to said control member for moving said control member in response to movement of said throttle, said throttle member being further operative to produce a desired engine speed schedule, speed means responsive to the actual speed of said engine and connected to said throttle to produce an output reflective of the error between desired and actual speed of said engine, said speed means being connected to said control member and being operative to prevent movement of said control member in an area decreasing direction when said error between desired and actual speed exceeds a predetermined amount, engine temperature sensing means operative to produce an electrical error signal responsive to the difference between a predetermined temperature reference and actual engine temperature, a torque motor connected to said engine temperature sensing means and including an output torque arm controlled by said electrical error signal, and a hydraulic power piston including a servo control valve operative to interrupt the connection between said throttle and said control member and control the position of said control member in response to movement of said hydraulic power piston, said servo control valve being connected to said output torque arm so that said hydraulic power piston is controlled to move at a rate proportional to said electrical error signal.

5. In a gas turbine engine control system, said engine having a variable area exhaust nozzle, the combination of a throttle member, a cam member positioned by said throttle member, a lever having a movable fulcrum intermediate the ends, cam follower means interconnecting said cam member and said movable fulcrum operative to position said movable fulcrum with variations in the position of said cam member, said lever being further connected to said variable area exhaust nozzle to vary the area thereof as a function of the position of said lever, temperature means operative to produce an error signal representative of the difference between a reference temperature and engine temperature and including a piston member movable at a rate proportional to said error signal, and means interconnecting said piston member and said cam follower means operative to interrupt the connection between said cam member and said movable fulcrum and control the movement of said movable fulcrum at a rate proportional to said error signal.

References Cited in the file of this patent

UNITED STATES PATENTS

| | | |
|---|---|---|
| 1,854,226 | Rouse | Apr. 19, 1932 |
| 2,028,089 | Erling | Jan. 14, 1936 |
| 2,683,348 | Petry | July 13, 1954 |
| 2,705,864 | Peters | Apr. 12, 1955 |
| 2,706,383 | Jacobson | Apr. 19, 1955 |
| 2,734,340 | Wood | Feb. 14, 1956 |
| 2,739,441 | Baker et al. | Mar. 27, 1956 |
| 2,796,136 | Mock | June 18, 1957 |
| 2,805,544 | Wells | Sept. 10, 1957 |
| 2,815,644 | Jacobson | Dec. 10, 1957 |
| 2,820,340 | Dolza et al. | Jan. 21, 1958 |

FOREIGN PATENTS

| | | |
|---|---|---|
| 1,061,753 | France | Dec. 2, 1953 |